(12) United States Patent
Greene et al.

(10) Patent No.: US 8,538,857 B2
(45) Date of Patent: Sep. 17, 2013

(54) ONLINE TRADING SYSTEM HAVING REAL-TIME ACCOUNT OPENING

(75) Inventors: David Greene, San Francisco, CA (US); Dennis Mierzwa, Walnut Creek, CA (US); Ayman Abukhater, South San Francisco, CA (US); Michael Sievert, Monte Sereno, CA (US)

(73) Assignee: **E*Trade Financial Corporation**, New York, NY (US)

( * ) Notice: Subject to any disclaimer, the term of this patent is extended or adjusted under 35 U.S.C. 154(b) by 472 days.

(21) Appl. No.: 12/833,111

(22) Filed: Jul. 9, 2010

(65) Prior Publication Data

US 2010/0274707 A1    Oct. 28, 2010

Related U.S. Application Data

(63) Continuation of application No. 09/802,701, filed on Mar. 9, 2001, now Pat. No. 7,778,913.

(51) Int. Cl.
*G06Q 40/00* (2012.01)
(52) U.S. Cl.
USPC .......................................... 705/37; 705/36 R
(58) Field of Classification Search
USPC .................................. 705/36 R, 37
See application file for complete search history.

(56) References Cited

U.S. PATENT DOCUMENTS

| | | | | |
|---|---|---|---|---|
| 5,825,880 A * | 10/1998 | Sudia et al. | ................... | 713/180 |
| 5,826,243 A * | 10/1998 | Musmanno et al. | ............ | 705/35 |
| 5,866,889 A * | 2/1999 | Weiss et al. | ................... | 235/379 |
| 5,940,809 A * | 8/1999 | Musmanno et al. | ............ | 705/35 |
| 5,940,811 A * | 8/1999 | Norris | .............................. | 705/38 |
| 6,105,007 A * | 8/2000 | Norris | .............................. | 705/38 |
| 6,226,623 B1 * | 5/2001 | Schein et al. | ................... | 705/35 |
| 6,408,282 B1 * | 6/2002 | Buist | ........................... | 705/36 R |
| 6,484,151 B1 * | 11/2002 | O'Shaughnessy | .......... | 705/36 R |
| 6,968,317 B1 * | 11/2005 | Wallace et al. | ............. | 705/36 R |
| 7,356,497 B1 * | 4/2008 | Bursey et al. | ............... | 705/36 R |
| 2002/0087344 A1 * | 7/2002 | Billings et al. | ..................... | 705/1 |
| 2002/0156720 A1 * | 10/2002 | Chow et al. | ..................... | 705/37 |

OTHER PUBLICATIONS

Gerlach, D. Trading Places: The Top Online Brokers, PC World. San Francisco: Feb. 1999, Iss. 2; p. 177, 7 pgs.*

* cited by examiner

*Primary Examiner* — Hani M Kazimi
(74) *Attorney, Agent, or Firm* — Conley Rose, P.C.

(57) ABSTRACT

In one embodiment, the online trading system having a real-time account opening process comprises one or more computers coupled to a network. The computers maintain a brokerage account database, and service web page requests received over the network. The web pages are preferably configured to implement a real-time account opening (RTAO) process that establishes new brokerage accounts in the account database. The RTAO process may include (a) obtaining contact information; (b) creating a new record in the brokerage account database for the contact information; (c) obtaining brokerage account application information; (d) updating the new record with the application information; (e) displaying a brokerage account contract; and (f) securing online agreement to said brokerage account contract. The process preferably also includes obtaining funding information to automatically initiate a transfer of funds to the brokerage account.

16 Claims, 4 Drawing Sheets

ONLINE TRADING SYSTEM HAVING REAL-TIME ACCOUNT OPENING

The present application is a continuation of Ser. No. 09/802,701, filed Mar. 9, 2001 now U.S. Pat. No. 7,778,913, and entitled "Online Trading System Having Real-Time Account Opening".

BACKGROUND

1. Field of the Invention

The present invention relates generally to systems and methods for providing online services. More particularly, the present invention relates to a online trading system that allows users to open accounts in "real time", i.e. the account is opened while the user waits, and the user is able to perform trading operations immediately after the account is opened.

2. Description of the Related Art

The stock market allows individuals to buy and sell ownership interests in publicly traded corporations. Such ownership interests may be traded through trading of shares of company stock, trading of options on a stock, and/or trading of holding companies or mutual funds that own a portion of the company.

The advent of online trading has made it convenient for individual investors to participate in the stock market, and consumer response to the availability of online trading has been phenomenal. In 1999 alone, the number of online brokerage accounts grew by over 100%, so that by the end of 1999 there were well over 10 million online brokerage accounts. The increased number of investors and increased trading volume has encouraged many brokerages to compete for market share by reducing trading costs. Of course, brokerages can only handle greater volumes at reduced costs by improving the efficiency of their processes.

One of the processes that would benefit the brokerage is the process for opening new accounts. The traditional process requires interested people to (1) call to request an application; (2) wait for the application to be mailed to them; (3) fill out and sign the application; (4) provide funding information or a write a check; (5) mail the completed application to the brokerage; (6) wait for the account to be opened; and (7) wait for the account access information to be mailed. This process takes an average of 3 weeks to complete, and costs the brokerage roughly $25 per application in time and processing expenses. The "abort" rate (customer decides not to complete the account opening process) ranges as high as 80%.

A recent improvement in the process for opening accounts is the "Online Application". In the Online Application process, interested people can locate and electronically fill out an application form on their computers, thereby bypassing steps (1) and (2) above. The brokerage also retained the application in electronic form, so step (6) also required less time. However, because the law requires a signature, people still had to print out, sign, and mail the applications. The Online Application process takes an average of five days to complete, and costs the brokerage roughly $12 per application in time and processing expenses.

Often, people are motivated to open a brokerage account because they have an investment idea they want to pursue. However, three weeks, or even three days, seems an eternity to people in this modern age of fast service and instant gratification. Thus the brokerages are frustrating the desires of their potential customers even before the first trade is placed. Accordingly, it would be desirable to provide a system by which investors could open trading accounts in real-time, and begin investing immediately once the account has opened. Such a system would preferably isolate the potential investor as much as possible from the commercial difficulties of Securities Exchange Commission (SEC) regulations, account administration, funds transfer, and fraud prevention, thereby making the investors first experiences as pleasant as possible.

SUMMARY OF THE INVENTION

The problems outlined above are at least in part addressed by an online trading system having a real-time account opening process. In one embodiment, the online trading system comprises one or more computers coupled to a network. The computers maintain a brokerage account database and service web page requests received over the network. The web pages are preferably configured to implement a real-time account opening (RTAO) and process that establishes and funds new brokerage accounts in the account database. The RTAO process may include (a) obtaining contact information; (b) creating a new record in the brokerage account database for the contact information; (c) obtaining brokerage account application information; (d) updating the new record with the application information; (e) displaying a brokerage account contract; and (f) securing online agreement to said brokerage account contract. The process preferably also includes obtaining funding information to automatically initiate a transfer of funds to the brokerage account.

The present invention further contemplates a method of trading an ownership interest in a publicly traded corporation. In one embodiment the method includes: (a) providing account application information to an online brokerage; (b) electronically signing an account agreement; (c) authorizing a real-time transfer of funds; and (d) placing a online trading order using an abbreviation associated with said publicly traded corporation. The real-time transfer of funds may preferably be an automated clearing house (ACH) transfer from a checking account, or may optionally be a credit card charge.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1A:
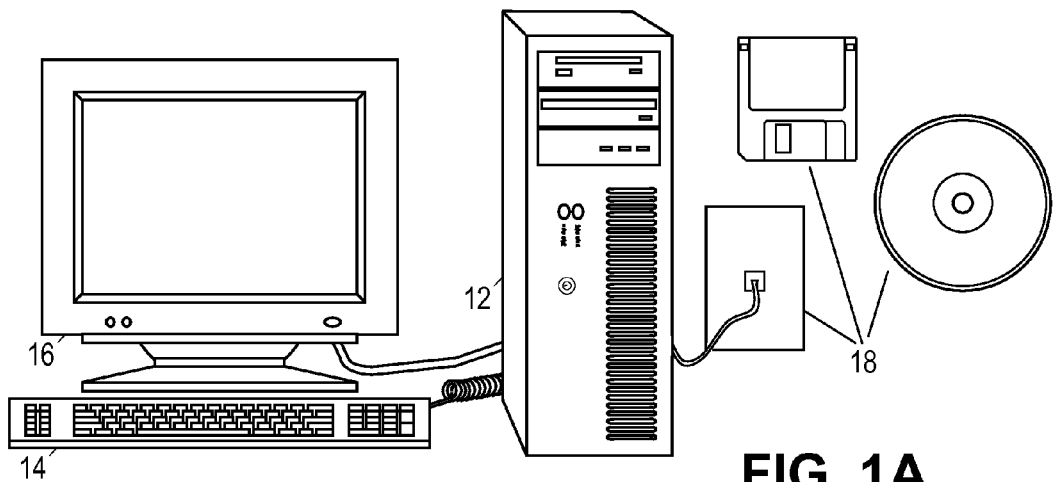
FIG. 1A is a prior art personal computer.

Turning now to the figures, FIG. 1A shows an exemplary computer system that a person can use to run software and access information on the internet. A user can interact with the computer system via the user input device 14 and the output device 16 that are coupled to the computer 12. The computer 12 executes software stored internally or received from digital information communication media 18. Of course many variations exist for each of these components, and the particular configuration shown is not intended to exclude other configurations that are known in the art.

Figure 1B:
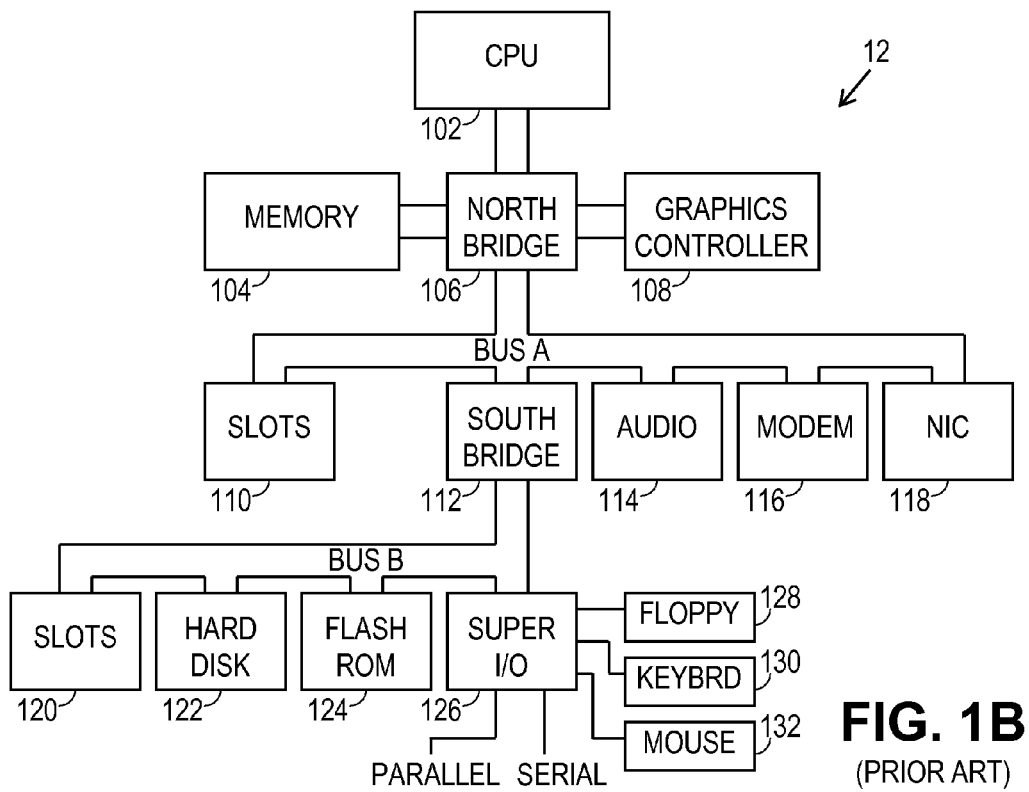
FIG. 1B is a representative block diagram of a personal computer.

FIG. 1B shows an exemplary configuration of a representative prior art computer 12. Computer 12 includes a CPU 102 coupled to a bridge logic device 106 via a CPU bus. The bridge logic device 106 is sometimes referred to as a "North bridge" for no other reason than it often is depicted at the upper end of a computer system drawing. The North bridge 106 also couples to a main memory array 104 by a memory bus, and may further couple to a graphics controller 108 via an advanced graphics processor (AGP) bus. The North bridge 106 couples CPU 102, memory 104, and graphics controller 108 to the other peripheral devices in the system through a primary expansion bus (BUS A) such as a PCI bus or an EISA bus. Various components that understand the bus protocol of BUS A may reside on this bus, such as an audio device 114, a modem interface device 116, and a network interface card (NIC) 118. These components may be integrated onto the motherboard, or they may be plugged into expansion slots 110 that are connected to BUS A. As technology evolves and higher-performance systems are increasingly sought, there is a greater tendency to integrate many of the devices into the motherboard which were previously separate plug-in components.

If other secondary expansion buses are provided in the computer system, as is typically the case, another bridge logic device 112 is used to couple the primary expansion bus (BUS A) to the secondary expansion bus (BUS B). This bridge logic 112 is sometimes referred to as a "South bridge" reflecting its location vis-à-vis the North bridge 106 in a typical computer system drawing. Various components that understand the bus protocol of BUS B may reside on this bus, such as hard disk controller 122, Flash ROM 124, and Super I/O controller 126. Slots 120 may also be provided for plug-in components that comply with the protocol of BUS B. The Super I/O controller 126 typically interfaces to basic input/output devices such as a keyboard 130, a mouse 132, a floppy disk drive 128, a parallel port, a serial port, and sometimes various other input switches such as a power switch and a suspend switch.

Figure 2:
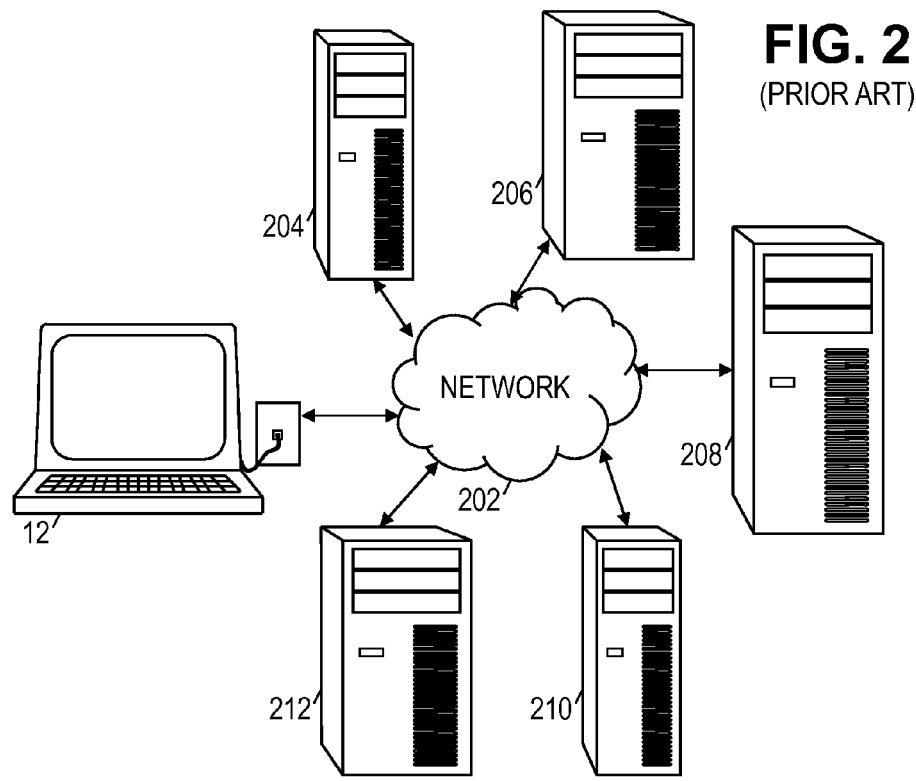
FIG. 2 is a prior art computer network.

Computer 12 may be coupled to a network or to the Internet via modem 116 or NIC 118. FIG. 2 shows an exemplary network 202 that couples computer 12 to other computers 204-212. In this circumstance, the user of computer 12 can access information stored on other computers. One way for a user to do this is to execute "browser" software on computer 12. Browser software is normally stored on internal long-term storage media such as hard disk 122 (FIG. 1B). When the user initiates execution of the software, the processor 102 loads the software into memory 104, and then accesses individual instructions from the software as needed for execution.

Browser software normally includes a graphical user interface (GUI) that graphically presents the user with a set of options on output device 16 (FIG. 1A), determines which, if any, of the available options that the user selects via input device 14, and responsively presents a new set of options in accordance with the user's selection.

Conventional browser software presents the user options in the form of a web page. The browser can retrieve the web page from computer 12 or from other computers coupled to the network. Web pages are typically written in hyper-text markup language (HTML), a programming language that allows programmers to present options in the form of "links" from graphics or textual items within a page to other pages having new options in similar form. Some web pages include embedded software "applets" that the browsers can execute to accept text input, perform calculations, animate objects on the screen, and/or send information to other computers.

Thus the user of computer 12 can access information and services provided by others on other computers coupled to network 202 (FIG. 2). One such service is online trading. In FIG. 2, assume one or more of the computers (say 212) is a web server, that is, a computer that provides access to a set of stored web pages. Another one or more of the computers (say 210) is an account server, that is, a computer that maintains a database of all customer accounts at a brokerage. Yet another one or more of the computers (say 208) is a trading server, that is, a computer that maintains a tracking database of prices for equities trading on the stock exchange(s), and that maintains a database of customer trading orders.

A user wishing to place an online trading order launches a web browser on computer 12, and accesses a "login" web page on web server 212. The login web page allows the user to type in a username and password, and press a graphic button labeled "Log In". Pressing the button causes the browser to send the typed information to web server 212 in an attempt to load an account web page. Web server 212 uses the received information to access account server 210 to verify that the user has an account, and to determine the various account balances, preferences, and notices. If the username and password are invalid, web server 212 sends a "login failure" web page to computer 12. Otherwise, web server 212 uses the information received from account server 210 to construct an account web page that is then sent to computer 12.

The user can then select a trading button on his account web page, prompting the computer 12 to retrieve a trading order web page from web server 212. The user can then type in a stock identifier, a price, and an order type, and press a "place order" button. Pressing the button causes computer 12 to send the order information to web server 212. Web server 212 accesses the account server 210 to verify that the necessary funds are present, and if so, accesses the trading server 208 to get ask and bid quotes for the stock, and constructs a review page. The review page gives the user a chance to review the order, compare his trade price with the current ask and bid quotes, and press either the "Proceed" button or the "Cancel" button. Pressing the Proceed button causes computer 12 to request a confirmation page from web server 212. In response, the web server 212 sends the order to trading computer 208, and sends a confirmation to computer 12.

The above description illustrates the interaction of the hardware involved in an example of an online trading system. However, the hardware configuration is merely the backdrop for the online trading system. To the user, and indeed, to the brokerage, the hardware configuration is invisible. A wide variety of hardware configurations may be used to achieve essentially the same results. Each of the tasks may be distributed across several computers or congregated onto one.

Figure 3:
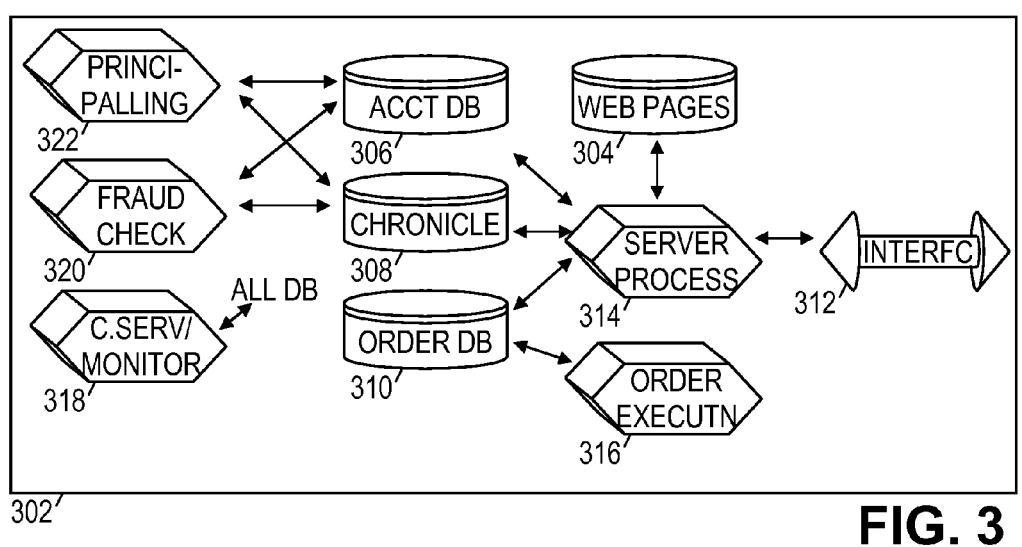
FIG. 3 is a component diagram of an online trading system in software space.

Accordingly, a popular way to design and explain network-based software and services is to use "software space". In software space, the focus is on the tasks to be performed and the interactions between the processes that perform them. FIG. 3 shows an online trading system 302 in software space. Online trading system 302 includes, among other things, a set of web page templates 304, a customer account database 306, a chronicling database 308, and an order database 310. Chronicling database 308 tracks changes to account database 306 and order database 310. A web-based interface 312 conveys communications to and from users accessing the online trading system 302. A web server process 314 provides via interface 312 web pages to the users in response to their requests. Other than the initial login page, the user's computers generate the requests in accordance with options provided by the server process 314 in the web pages. In this manner, the server process 314 maintains control of user access.

The web pages provided by the server process 314 are generated by the server process 314 using templates 304 and information obtained from databases 306-310. The requests received by the server process 314 guide the process in communicating with the databases to obtain the information needed to service user requests. As mentioned before, these requests will be limited to options provided by the server process 314 in accordance with the web page templates 304. Consequently, the web page templates 304 define procedures for users to accomplish their desired actions. Some of these procedures are described in detail further below.

The online trading system 302 also includes other processes, such as, e.g., an order execution process 316, a customer service process 318, a fraud checking process 320, and a principalling process 322. Each of these processes runs concurrently and independently. Order execution process 316 operates on trading order database 310 to identify which orders can be completed, and to present these orders to the trading exchange (not specifically shown) for acceptance. Once accepted, the orders are marked completed and the account database is updated accordingly.

Customer service/monitoring process 318 monitors the databases for errors and alerts customer service personnel of any conditions that may require intervention to correct. For example, if real-time accounts remain unfunded after three days, the monitoring process will alert a customer service representative who will cancel any pending limit orders and process other trades in accordance with established risk guidelines. Customer service personnel can also access the databases via process 318 to resolve any customer complaints.

Fraud checking process 320 screens the account database and chronicling database for questionable account information or suspicious trading activity. This process preferably reviews all new accounts every 30 minutes. Process 320 will flag the relevant accounts for review by a customer service representative and/or impose restrictions on activity in the account.

Principalling process 322 is now described in detail, beginning with the traditional method. Traditionally, the national association of securities dealers (NASD) regulations have required that every account application be reviewed by a "principal", i.e. a brokerage representative authorized to make business decisions for the brokerage. The principal scans the application and determines the appropriate account restrictions for margin and option accounts, taking into consideration the net worth, goals, and investment style of the applicant. This must be done within three days of the settlement of the first trade for cash accounts, and within one day of the settlement for option accounts. Recently, this procedure involved manual scanning of applications into work distribution software. The work distribution software then made the application available in image form for review by the principals.

Principalling process 322 reduces the effort associated with the principalling procedure. Server process 314 in conjunction with templates 304 allows a user to perform the account opening process online, as described in greater detail below. Principalling process 322 makes use of the application information as stored in the account database 306.

Figure 4:
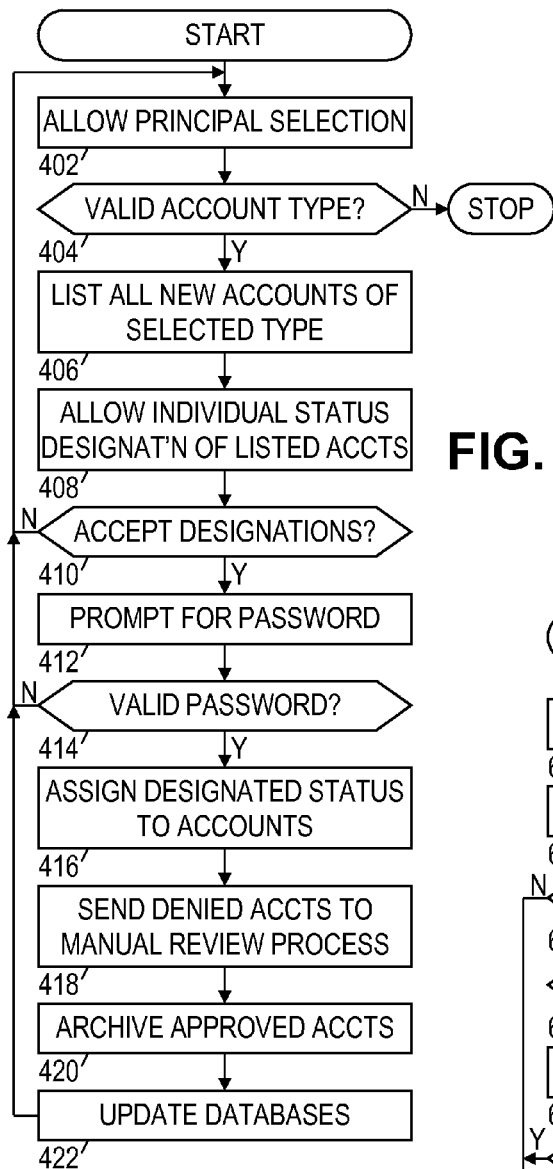
FIG. 4 is a flowchart of a principalling process.

FIG. 4 shows a flowchart of principalling process 322. A brokerage representative may initiate the principalling process by clicking a desktop icon or selecting the program from the program menu. In block 402, the representative is presented with a "Principal Selection" screen preferably having radio button choices of (a) cash-only accounts; (b) margin accounts; and (c) option accounts. The selection screen preferably also includes a "Go" button and a "Done" button. The representative may select one of the account types and press the "Go" button, or may press the "Done" button to exit.

Block 404 tests to see if the Done button was pressed. If so, the process halts. Otherwise, in block 406, the process lists all unprincipalled accounts of the selected type. Alternatively, if there exists more than some maximum number of unprincipalled accounts (e.g. 100), the process may present the maximum number of accounts. The account listing preferably provides different fields depending on the account type. For cash-only accounts, the account listing preferably includes:

Registration (Individual, JTWROS, Custodian, etc)
Customer name
Mailing address
Additional address (if any)
Date of birth
Country of residence
Occupation
Employer
Employer business address (city, state, zip code)
Officer, Director or 10% shareholder (Yes/No and company name)

For margin accounts, the account listing preferably includes the above fields along with:

Annual Income
Total Net Worth
Liquid Net Worth
Investment Objective

For option accounts, the account listing preferably includes the fields for cash and margin accounts, along with:

Option level requested (level 1, 2 or 3)
Marital Status
Number of dependents
Options knowledge
Options trading experience
Average transaction size
Number of years experience in trading stocks
Number of years experience in trading bonds
Number of years experience in trading options
Total transactions per year in stocks
Total transactions per year in bonds
Total transactions per year in options A check box is preferably provided next to each account in the listing. In block 408, a principal scrolls through the listing, selecting the check boxes next to the accounts that the principal wishes to decline. The computer may pre-select check boxes of accounts that do not satisfy heuristic criteria. Alternatively, the selected check boxes may indicate the accounts that the principal wishes to accept, and the computer may pre-select check boxes of accounts that do satisfy heuristic criteria.

Once the principal is satisfied with the assigned account statuses, the principal can press a "Continue" at the bottom of the listing. Alternatively, the principal can press a "Cancel" button at the bottom of the listing. In block 410, a test is made to determine which button was pressed. If the cancel button was pressed, the process returns to the Principal Selection screen in block 402. Otherwise, the process prompts the Principal for a password in block 412. Block 412 may also require the Principal to enter a username as well. If the password is incorrect, additional attempts may be allowed.

Block 414 tests the validity of the password. If the password is still incorrect after several attempts, the process returns to the principal selection screen in block 402. Otherwise, the process assigns the designated accept/decline status to the listed accounts in block 416. In block 418, accounts which have been declined may be sent to the manual review process. Preferably, this involves assigning the declined accounts to a customer service representative who may review the reasons for disapproval and may work with the customer to rectify defects in the application.

In block 420, the approved accounts are archived to Write-Once-Read-Many (WORM) storage media, where they are kept to satisfy regulatory requirements. In block 422, each of appropriate online databases are updated to reflect the assigned status of the principalled accounts. A report may also be generated at this time. The process then returns to the selection screen in block 402.

This completes the detailed description of the principalling process 322. Some aspects of the server process 314 are now described. In particular, the account opening process and the trading order entry process implemented by server process 314 will be described in detail.

Figure 5:
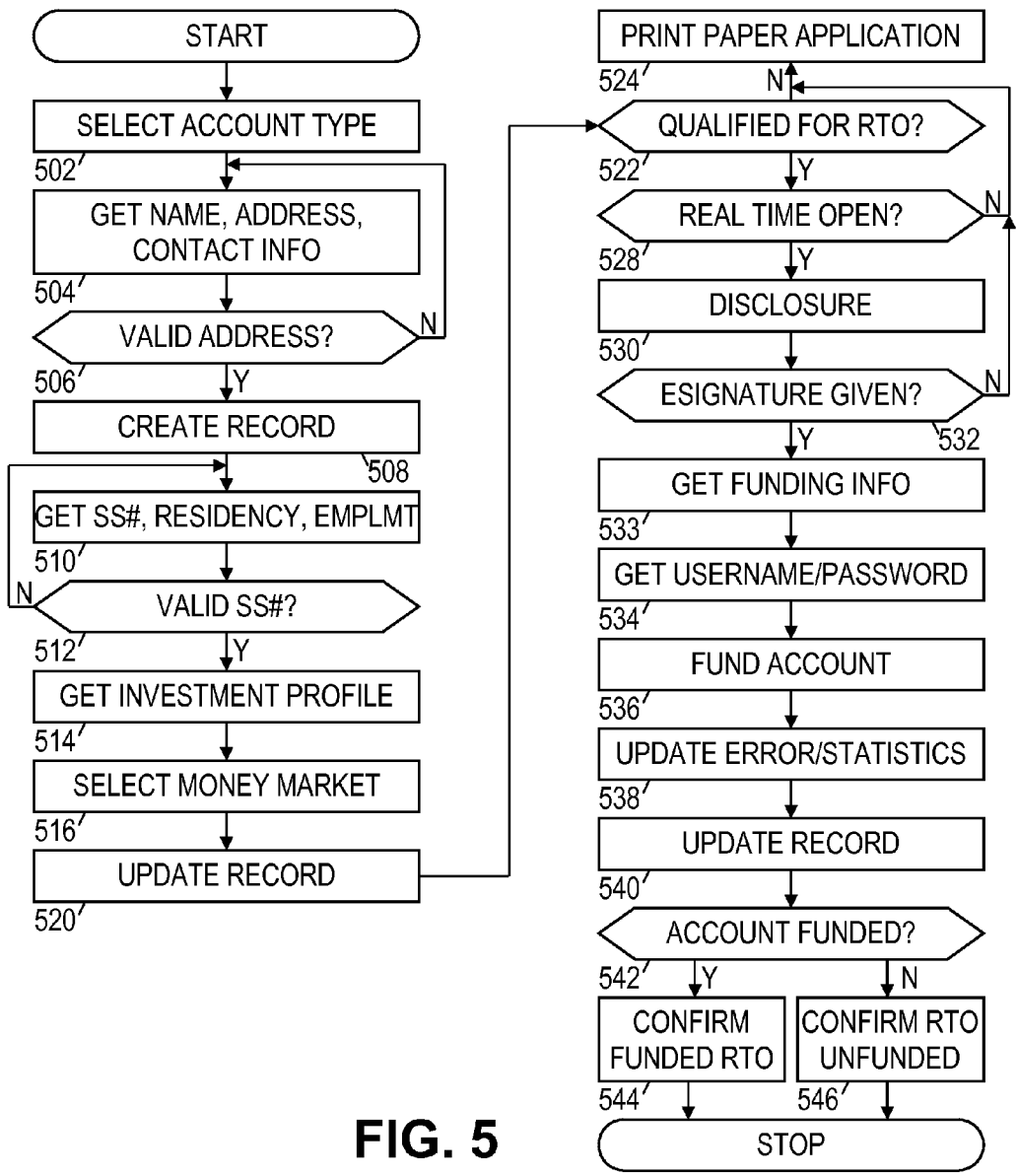
FIG. 5 is a flowchart of a real-time account opening process.

FIG. 5 shows a flow diagram of the account opening process. This process will preferably be available seven days per week or have the capability to queue transactions while the system is unavailable so that there is no negative impact on real-time transactions. The server application that implements the account opening is preferably fully redundant and fault-tolerant.

The process begins in block 502 where the customer is presented with an initial "Application" screen that allows the customer to select an account type and a funding method. Three account types are presented, with a radio button next to each:

Cash account—requires full funds for purchases

Margin account—allows borrowing against the assets in the account

Margin account with options trading.

The customer selects one of the account types, and then selects a funding method. Four options are provided for the funding method, with a check box next to each:

Trade today—Open and fund real-time using funds from checking account

Check enclosed

Transfer an account from another brokerage, mutual fund, or bank

Securities certificate(s) enclosed (such as stock certificates).

The customer selects at least one of the boxes, and then presses a "Next" button. Note that the Trade today option may be absent if the server process determines that one or more of the required databases for real-time account opening is unavailable.

In block 504, the customer is prompted to enter name, address, and contact information such as phone number, email address, etc. In block 506, the address is verified. This verification may include, for example, examining a zip code database to verify that the given city includes that zip code. If a discrepancy is detected, the customer is given unlimited opportunities to correct it. Once the address is verified, an account record is created in block 508, and the account is added to the account database. This allows customer service to follow through if for some reason the application process is not completed.

In block 510, the customer is prompted to enter a social security number, a date-of-birth, residency, and employment information. In block 512, the entered information is verified. The verification may include, for example, looking up the social security number in a database to ensure that the social security number is valid. The customer is given unlimited opportunities to correct any detected discrepancies. Once the discrepancies have been eliminated, the customer is prompted for investment profile information in block 514. The investment profile includes such information as the customer's investment objectives, investment experience, and other investment accounts.

In block 516, the customer is prompted for a cash reserve portfolio, i.e. money market, treasury bonds, etc., in which to place money not currently invested in securities. In block 520, the customer's account record is updated with the information that the customer has entered. In block 522, a test is made to determine if the customer qualifies for a real-time open account. The requirements include U.S. Citizenship or Resident Alien status, a valid social security number, and not being an employee of a brokerage or securities dealer. The requirements may include that the account not be an options account. In addition, the requirements may include a restriction that the customer not have opened more than one account within the past day or so. If the requirements are not satisfied, then in block 524, the application is printed on paper for the customer to sign and send to the brokerage along with any additional required materials.

If the requirements for real-time account opening are satisfied, then in block 528 a test is made to determine if the customer requested real-time account funding. If not, then in block 524 the application is printed for mailing with a check or other source of funds for the account. Otherwise, the customer is provided with a disclosure in block 530. The disclosure preferably complies with the state and federal E-Signature laws, as well as any applicable and NASD regulations, and may read as follows:

Real-time Account Agreement

I am of legal age to contract. I acknowledge that I have received, read, and agree to be bound by the terms and conditions as currently set forth in the Customer Agreement and as amended from time to time. I ACKNOWLEDGE THAT THIS BROKERAGE DOES NOT PROVIDE INVESTMENT, TAX, OR LEGAL ADVICE OR RECOMMENDATIONS. Under penalty of perjury, I certify (1) that my Social Security (or taxpayer ID) number shown on this form is correct and (2) that I am not subject to backup withholding because (a) I am exempt from backup withholding, or (b) I have not been notified by the IRS that I am subject to backup withholding or (c) I have been notified by the IRS that I am no longer subject to backup withholding (cross out item 2 if it does not apply to you). [The Internal Revenue Service does not require your consent to any provision of this document other than the certifications required to avoid backup withholding.]

I understand that this brokerage will supply my name to issuers of any securities held in my account so that I might receive any important information from them, unless I notify you in writing not to do so.

I acknowledge that securities held in my Margin account may be pledged, re-pledged, hypothecated, or rehypothecated for any amount due this brokerage in my account(s) or for a greater amount. I UNDERSTAND THAT THIS ACCOUNT IS GOVERNED BY A PRE-DISPUTE ARBITRATION CLAUSE CONTAINED IN THE CUSTOMER AGREEMENT.

Please select one:

⊙ I AGREE
○ I DISAGREE

Your name:

| First name | Middle name (optional) | Last name |
|---|---|---|
| John | Q. | Doe |

By selecting the radio button labeled "I Agree" immediately over the customer's printed name, and pressing the "Next" button, the customer is electronically signing a binding agreement. Block 532 checks to see if the agreement has been electronically signed. If not, then the application is printed out for a manual signature in block 524. Otherwise, the customer is prompted for funding information in block 533. This funding information is that which is required for an Automated Clearing House (ACH) transfer of funds from a checking account. It includes standard information from printed checks such as the Name of the Financial Institution, the routing number, and the account number. The amount of the transfer is preferably limited to between $1000 and $5000. The ACH information may preferably be validated, i.e. the computer may verify that the routing number has nine numeric digits, and begins with a 0, 1, 2, or 3.

In block 536, the ACH transfer is attempted to fund the account. The results of the attempt are logged in a statistics database in block 538, as well as to the account in block 540. In block 542, a test is made to determine if the account has been funded. The appropriate confirmation page is provided in block 544 or block 546. In block 544, a congratulations page is provided with current buying power and trading instructions. An explanation may be provided to explain the accounting method for RTO accounts. For example, the explanation may state that a real-time account balance will be displayed as zero prior to trading and funding and will be displayed as a negative amount after trading but prior to funding. Once the funds have been deposited in the E*TRADE account, the account balance will display the buying power.

In block 546, a message is provided that the account has been successfully opened, but that the funds transfer has not been completed. If the transfer is pending, a customer service number is also provided, and the customer is encouraged to call or check back later. If no transfer is pending, the customer is requested to fund the account by mailing a check. Trading is not allowed for these accounts until the funds are received (i.e. the buying power is set to zero). This completes the account opening process.

Figure 6:
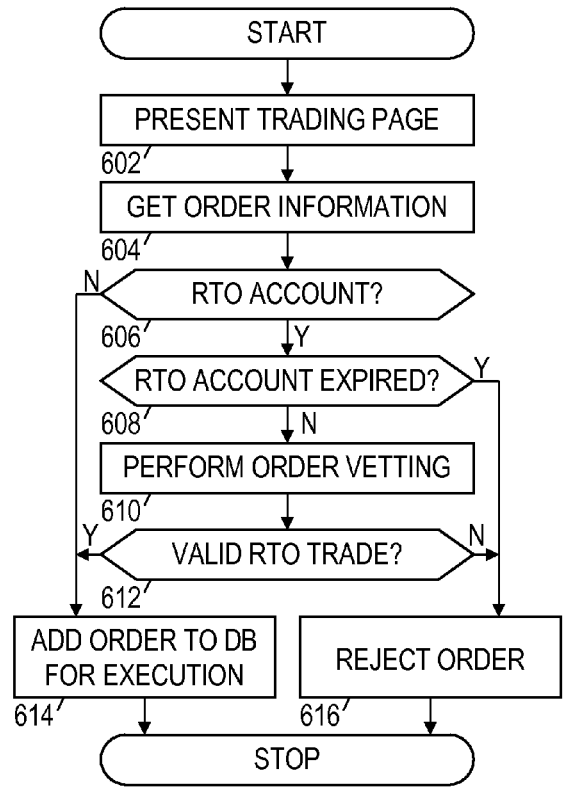
FIG. 6 is a flowchart of a trading order placement process. While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The trading order entry process is shown in FIG. 6. In block 602 a trading page is presented, from which a customer may request stock quotes, account balances, and recent news items. The customer may also press a "Place Trading Order" button to place an order. In block 604, the customer is presented with an order form that has fields for order type (market, limit), number of shares, stock symbol, and price. When the customer presses a "Done" button, the information is parsed and presented to the customer as the computer understands it, and the customer is asked to press a "Confirm" button.

Once the customer confirms, a test is made in block 606 to determine if the customer's account is a Real-Time Open account. Accounts that have been opened using the real-time account opening process described previously preferably continue to be labeled as RTO accounts until the funds have been received by the brokerage (usually within 3 days). If the account is not a real-time account, in block 614 the order is added to the order data base 310 for execution by the trading process 316 (FIG. 3), and the customer is presented with an "Order accepted" page.

Otherwise, in block 608 the process checks to see if the RTO account has expired, i.e. if more than 3 days have passed without the arrival of funding for the account. If the account has expired, then in block 616, the customer is presented with an "Order rejected" page. If the account hasn't expired, then in block 610, the order is examined for compliance with the restrictions placed on RTO accounts. These restrictions may include a prohibition on trading highly volatile stocks, thinly traded stocks, and "penny" stocks. Also, the customer may not be allowed to perform short sales or trade options, mutual funds, or bonds. The transaction amount plus preceding transaction amounts may be required to be less than the customer's initial funding amount. In block 612, the validity of the order is determined, and if the order complies with the restrictions, it is added to the order database in block 614. Otherwise, it is rejected in block 616.

While preferred embodiments of this invention have been shown and described, modifications thereof can be made by one skilled in the art without departing from the spirit or teaching of this invention. For example, real-time funding of accounts may be accomplished using a credit card or debit card. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method, comprising
principalling, by a processor, online brokerage accounts, wherein the principalling comprises:
obtaining an account type selection;
presenting electronically a list of new brokerage accounts having the selected account type to at least one principal, the principal representing a brokerage;
obtaining from the at least one principal an individual status designation for each of the new brokerage accounts listed, wherein said designation is indicative of acceptance or non-acceptance of the new brokerage accounts;
obtaining a password from the at least one principal; and
if the password is valid, updating records of the new brokerage accounts to reflect the individual status designations.

2. The method of claim 1, further comprising receiving authorization for a real-time transfer of funds, wherein the real-time transfer of funds is an automated clearing house (ACH) transfer from a checking account.

3. The method of claim 1, further comprising receiving authorization for a real-time transfer of funds, wherein the real-time transfer of funds is a credit card charge.

4. The method of claim 1, further comprising presenting an electronically signable account agreement, wherein said presenting comprises presenting an agreement indicator displayed adjacent to the account agreement, wherein the account agreement specifies a named individual.

5. The method of claim 4, wherein said agreement indicator is one of a plurality of indicators displayed adjacent to said account agreement, wherein the plurality of indicators includes a selectable disagreement indicator.

6. An online trading system that comprises:
at least one computer coupled to a network and configured to maintain a brokerage account database; and
at least one computer coupled to the network and configured to execute a principalling process on new brokerage accounts in the brokerage account database, the process comprising:
principalling online brokerage accounts, wherein the principalling process comprises:
obtaining an account type selection;

presenting electronically a list of new brokerage accounts having the selected account type to at least one principal, the principal representing a brokerage;

obtaining from the at least one principal an individual status designation for each of the new brokerage accounts listed, wherein said designation is indicative of acceptance or non-acceptance of the new brokerage accounts;

obtaining a password from the at least one principal; and if the password is valid, updating records of the new brokerage accounts to reflect the individual status designations.

7. The system of claim 6, further comprising at least one computer coupled to the network and configured to use a plurality of web page templates to service web page requests received over the network, wherein the web page templates are configured to implement a real-time account opening process that establishes new brokerage accounts in the brokerage account database and wherein the real-time account opening process includes:

obtaining contact information;

creating a new record in the brokerage account database reflecting said contact information;

obtaining brokerage account application information;

updating said new record in accordance with said brokerage account application information;

displaying a brokerage account contract; and securing online agreement to said brokerage account contract.

8. The system of claim 7, wherein the real-time account opening process further includes:

after securing said online agreement, obtaining funding information relating to a financial account;

automatically initiating a transfer of funds from said financial account; and updating said new record with a buying power greater than zero.

9. The system of claim 8, wherein the real-time account opening process further includes:

displaying a confirmation page indicating successful completion of the real-time account opening process.

10. The system of claim 8, wherein the financial account is a checking account.

11. The system of claim 8, wherein the financial account is a credit card account.

12. The system of claim 7, wherein said securing is accomplished by an electronic signature.

13. The system of claim 6, wherein the web page templates are further configured to implement a trading order placement process.

14. The system of claim 6, wherein the principalling process further comprises:

storing application information of accepted new brokerage accounts on archival media.

15. The system of claim 6, further comprising:

at least one computer coupled to the network and configured to execute a fraud checking process on new brokerage accounts in the brokerage account database.

16. A non-transitory computer-readable storage device comprising instructions that, when executed, cause one or more processors to:

principal online brokerage accounts, wherein the principalling causes the one or more processors to:

obtain an account type selection;

present electronically a list of new brokerage accounts having the selected account type to at least one principal, the principal representing a brokerage;

obtain from the at least one principal an individual status designation for each of the new brokerage accounts listed, wherein said designation is indicative of acceptance or non-acceptance of the new brokerage accounts;

obtain a password from the at least one principal; and if the password is valid, initialize an update of records of the new brokerage accounts to reflect the individual status designations.

* * * * *